United States Patent [19]

Baues et al.

[11] 4,099,836

[45] Jul. 11, 1978

[54] OPTICAL CONTROL DEVICE FOR INTEGRATED OPTICAL CIRCUIT

[75] Inventors: Peter Baues, Krailling; Rolf Pläettner, Ottobrunn, both of Germany

[73] Assignee: Siemens Aktiengesellschaft, Berlin & Munich, Germany

[21] Appl. No.: 723,146

[22] Filed: Sep. 14, 1976

[30] Foreign Application Priority Data

Sep. 18, 1975 [DE] Fed. Rep. of Germany ....... 2541673

[51] Int. Cl.² .............................................. G02B 5/14
[52] U.S. Cl. .............................. 350/96.14; 350/96.34; 350/150; 350/355
[58] Field of Search ....................... 350/96 WG, 160 R

[56] References Cited

U.S. PATENT DOCUMENTS

| | | | |
|---|---|---|---|
| 3,660,673 | 5/1972 | Anderson | 350/96 WG UX |
| 3,813,142 | 5/1974 | Buhrer | 350/96 WG |
| 3,883,220 | 5/1975 | Taylor | 350/96 WG |
| 3,916,510 | 11/1975 | Martin | 350/96 WG X |
| 3,923,374 | 12/1975 | Martin | 350/96 WG |
| 3,923,376 | 12/1975 | Martin | 350/96 WG |
| 3,958,862 | 5/1976 | Scibor-Rylski | 350/96 WG X |
| 4,003,629 | 1/1977 | Baues et al. | 350/96 WG X |
| 4,008,947 | 2/1977 | Baues et al. | 350/96 WG X |

*Primary Examiner*—John K. Corbin
*Assistant Examiner*—John D. Lee
*Attorney, Agent, or Firm*—Hill, Gross, Simpson, Van Santen, Steadman, Chiara & Simpson

[57] ABSTRACT

An optical control device suitable for utilization in an integrated optical system. The control device employs a monocrystalline substrate and a thin monocrystalline layer mounted thereon.

14 Claims, 4 Drawing Figures

OPTICAL CONTROL DEVICE FOR INTEGRATED OPTICAL CIRCUIT

BACKGROUND OF THE INVENTION

In integrated optical circuits, thin monocrystalline layers are employed upon supporting substrates. Suitable substrates can either consist of a glass or of a crystalline material. The index of refraction of an applied thin crystalline layer adjacent the substrate must be higher than the index of refraction of the adjoining substrate so that light waves can diffuse in such thin layer by total reflection.

When such a thin crystalline layer is to be produced epitaxially, then the substrate must be a monocrystal with matched adjusted lattice constants, where electro-optical, magnet-optical, or acousto-optical effects in such thin layer and/or crystal are necessary for the achievement of modulators, switches, and the like.

BRIEF SUMMARY OF THE INVENTION

This invention provides an optical control device which is adapted for incorporation into an integrated optical circuit system and which utilizes a combination of substrate layer and facing layer associated therewith. The invention further provides methods for making such a control device using monocrystalline layers.

A principal object of this invention is to provide an integrated optical control device which shows a particularly high degree of control effectiveness.

Another object is to provide such an optical control device which can be produced simply and cheaply.

Other and further objects, aims purposes, advantages, features, aspects, and the like will be apparent to those skilled in this art from the associated specification and accompanying drawings.

DETAILED DESCRIPTION

Figure 2:
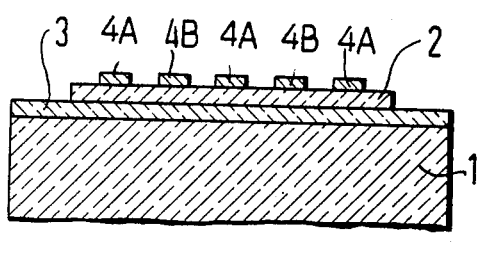
FIG. 2 is a vertical transverse sectional view taken along the line II—II of FIG. 1.
Figure 1:
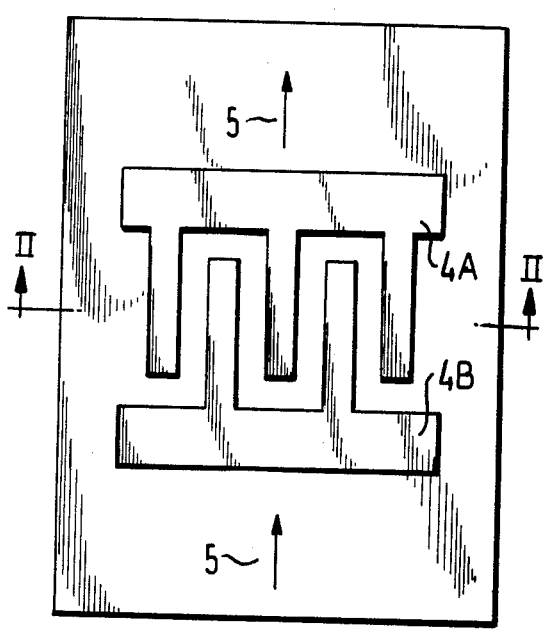
FIG. 1 is a plan view of one embodiment of an optical control device of this invention.

Referring to the drawings, there is seen in FIGS. 1 and 2 one form of optical control device of this invention. This device utilizes a substrate 1 of about 1 mm of thickness and about 1 cm² of surface which is here comprised of a mixed monocrystalline composition of strontium titanate ($SrTiO_3$) and barium titanate ($BaTiO_3$). Alternatively, substrate 1 can be comprised of monocrystalline strontium titanate.

On substrate 1 is deposited a thin layer 3 of monocrystalline material. When substrate 1 is so comprised either of such a mixed crystalline composition $BaTiO_3$ and $SrTiO_3$, or such a crystalline $BaTiO_3$, layer 3 can comprise $SrTiO_3$. Alternatively, when substrate 1 is so comprised of $SrTiO_3$, layer 3 can be comprised either of monocrystalline $BaTiO_3$ or a mixed monocrystalline composition of $BaTiO_3$ and $SrTiO_3$. Layer 3 functions as a light wave guide. The substrate has a thickness of about 1 to 2 mm and a surface of about 1 cm² where the layer 3 is deposited. For the layer 3 the thickness is some um, dependent on the number of modes, which are to be guided in this waveguide layer.

A presently preferred such mixed monocrystalline composition comprises 97 mole percent of $BaTiO_3$ and 3 mole percent $SrTiO_3$ and is representable by the formula $Ba_{0.97}Sr_{0.03}TiO_3$. Such a mixed composition may be generically formulated as $Ba_{1-x}Sr_xTiO_3$.

In a preferred embodiment of a control device of this invention, an intermediate layer 2 is deposited over layer 3. Layer 2 is comprised of a dielectric material which can comprise, for example, polycrystalline silicon dioxide ($SiO_2$), or the like. Also, in such a preferred embodiment, electrodes are additionally mounted over such layer 2, such as electrodes 4, which are preferably comprised of a conductive metal layer, such as gold or the like, and are here illustratably shown to have a comb form. The thickness of layer 2 is 0.5 mm or smaller and is determined by the attenuation of the guided light in layer 3, which would appear when the electrodes contact directly layer 3.

A control device of this invention, can by employed as a polarizer, a modulator, a deflector, a switch, a filter, or the like as those skilled in the art will appreciate.

Barium titanate and strontium titanate belong to the Perovskite family of minerals. The Curie temperature of $SrTiO_3$ lies at 37° K and that of $BaTiO_3$ at 401° K. At room temperature, $SrTiO_3$ belongs to the cubical crystal class m3m, and $BaTiO_3$ to the tetragonal crystal class 4mm. The crystal class of $SrTiO_3$ is centrally symmetrical at room temperature, and for that reason this type of crystal shows no linear electro-optical effect. For $BaTiO_3$ in the form of an unclamped (strain free) crystal, the electro-optical coefficient of $r_{51}$ is about 50 times larger than the same coefficient of monocrystalline $LiN6O_3$. The coefficients $r_{13}$ and $r_{33}$ are about the same size in each of $BaTiO_3$ and $LiNbO_3$. $BaTiO_3$ and $SrTiO_3$ are each transparent between about 0.4 microns and 7 microns. The index of refraction of $SrTiO_3$ ($n = 2.38$ at $\lambda = 0.63$ microns) lies between the ordinary index of refraction ($n_o = 2.41$ at $\lambda = 0.63$ microns) and the extraordinary index of refraction ($n_a = 2.36$ at $\lambda = 0.63$ microns) for $BaTiO_3$. For this reason $SrTiO_3$ and $BaTiO_3$ can be used alternately as substrate and wave guide layer in a control device of this invention. This preferred combination of materials is thus suited for the production of integrated optical polarizers, modulators, deflectors, switches, filters, and the like, as desired.

For purposes of making switches of this invention, $BaTiO_3$ monocrystals or monocrystalline layers are prepared wherein preferably substantially no hexagonal phase arises. Such crystals can be produced chemically by admixing about 3 mole percent of $SrTiO_3$ with 97 mole percent $BaTiO_3$. Then, there results a mixed monocrystal of the formula $Ba_{0.97}Sr_{0.03}TiO_3$ which has the desired tetragonal phase wherein the lattice constants are $a = 3.989$ Å, $c_o = 4.032$ Å. This crystalline material matches the monocrystalline $SrTiO_3$ crystal lattice, where $a_o = 3.905$ Å within an accuracy of about 2 or 3% and fulfills a necessary prerequisite for epitaxy (i.e., growth of a crystal on the surface of another similar crystal substrate where the growth of the deposited crystal is oriented by the lattice structure of the substrate crystal).

Figure 3:
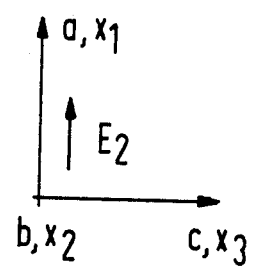
FIG. 3 is a diagrammatic plot showing the relationship between crystal axes in such embodiment of FIGS. 1 and 2.
Figure 4:
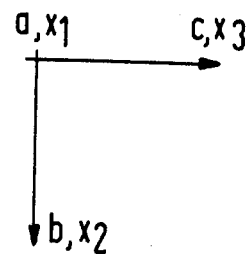
FIG. 4 is another diagrammatic plot showing another relationship between crystal axes in such embodiment of FIGS. 1 and 2.

After a substrate and a wave guide layer are prepared in face-to-face engagement with one another, as taught herein, the wave guide layer is poled so as to produce axial directions as illustrated in FIGS. 3 and 4. Poling can conveniently be accomplished by raising the wave guide layer to a temperature above its Curie point and simultaneously applying thereto an appropriate electrical field. Thereafter the so treated layer is cooled below its Curie point.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

Liquid Phase Epitaxy: Production of (a) monocrystalline mixed BaTiO$_3$/SrTiO$_3$ compositions and (b) monocrystalline SrTiO$_3$ compositions A starting strontium titanate monocrystalline substrate body with its crystal axes oriented spatially toward position 100 has a flat face thereof brought into contact with a liquid melt solution comprised of 50 mole percent potassium fluoride (KF) and 50 mole percent lithium fluoride (LiF) which has dissolved therein a preformed material of the formula Ba$_{0.97}$ Sr$_{0.03}$ TiO$_3$ to a nearly saturated solution. The system is initially at a temperature of about 1100° C. Over a 70 hour period, the system is cooled to 900° C with a linear temperature change rate of 3° C per hour. During this period, monocrystalline body of Ba$_{0.97}$ Sr$_{0.03}$TiO$_3$ grows as a smooth epitaxial layer upon such flat face of the substrate body. The saturation point of the melt, at which growth is starting, is determined by an experimental run.

Such procedure can similarly be used with Sr TiO$_3$ being dissolved in place of Ba$_{0.97}$Sr$_{0.03}$TiO$_3$ in the same KF/LiF melt solvent and with a starting monocrystalline body of the formula Ba$_{0.97}$ Sr$_{0.03}$ TiO$_3$ being used in place of the starting body of strontium titanate in which event a monocrystalline body of SrTiO$_3$ is epitaxially grown.

EXAMPLE 2

Diffusion: Production of (a) monocrystalline mixed BaTiO$_3$/SrTiO$_3$ layers and (b) SrTiO$_3$ layers A starting strontium titanate monocrystalline substrate body with its crystal axes oriented spatially toward position 100 has a flat face thereof coated with a barium layer applied by vacuum vapor deposition or sputtering. Then, this barium layer is diffused into the surface of the substrate body to a desired depth (a few microns) by heating the system to a temperature of, for example, about 1000° C for a time of about 5 hours. The resulting system is subsequently exposed to an pure oxygen atmosphere at an elevated temperature for a brief time, e.g. 30 minutes at a temperature between 800° and 1000° C. The resulting product is a monocrystalline wave guide layer comprised of s composition of the formula

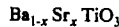
Ba$_{1-x}$Sr$_x$TiO$_3$

Such procedure can similarly be used for the production of a monocrystalline layer of Sr TiO$_3$ on a substrate comprised of monocrystalline Ba$_{0.97}$ Sr$_{0.03}$ TiO$_3$.

EXAMPLE 3

Production of Embodiment of device shown in FIGS. 1-4

Substrate 1 is here comprised of monocrystalline Sr TiO$_3$, and wave guide layer 3 is comprised of mixed monocrystalline Ba$_{0.97}$ Sr$_{0.03}$ TiO$_3$. Layer 3 is produced either by the liquid phase epitaxy of Example 1 or by the diffusion of Example 2. Layer 3 is poled in such a fashion that the axial directions are as indicated in FIGS. 3 and 4. To this end, a corresponding electrical field is applied to layer 3, and the layer 3 is simultaneously heated to above its Curie point. Then, layer 3 is cooled to below its Curie point. Subsequently, a dielectric intermediate layer 2 of polycrystalline SiO$_2$ is vapor deposited onto the open face of layer 3. Thereafter, an electrode structure 4 is applied in the form of a pair of combs 4A and 4B, respectively whose teeth interdigitate in spaced relationship laterally to one another by vapor deposition, structure 4 being comprised of gold.

In layer 3, input light waves diffuse in the direction of the electrode structure 4, as shown by the arrow 5. The electrical light-field control strength E$_2$ extends parallel to the X$_1$ axis. When an electrical voltage is applied across the respective sets of comb teeth (that is, between combs 4A and 4B), an index of refraction variation is formed in the area of the comb-teeth 4A and 4B which leads to diffraction of light and thus causes a light-modulation in this device.

EXAMPLE 4

Production of Embodiment of device shown in FIGS. 1-4

Substrate 1 is here comprised of monocrystalline Sr TiO$_3$, and layer 3 is comprised of Ba TiO$_3$. Layer 3 is produced by either liquid phase epitaxy, as in Example 1, or by diffusion as in Example 2. Layer 3 is poled in such a fashion that the axial directions are as indicated in FIGS. 3 and 4. To this end, a corresponding electrical field is applied to layer 3, and the layer 3 is simultaneously heated to above its Curie point. Then, layer 3 is cooled to below its Curie point. Subsequently, a dielectric intermediate layer 2 of polycrystalline SiO$_2$ is vapor deposited onto the open face of layer 3. Thereafter, an electrode structure 4 is applied in the form of a pair of combs 4A and 4B, respectively, whose teeth interdigitate in spaced relationship laterally to one another by vapor deposition, structure 4 being comprised of gold.

In layer 3, input light waves diffuse in the direction of the electrode structure 4 as shown by the arrow 5. The electrical light-field strength E$_2$ extends parallel to the X$_1$ axis. When an electrical control voltage is applied across the respective sets of comb teeth (that is, between combs 4A and 4B), an index of refraction variation is formed in the area of the comb-teeth 4A and 4B which leads to diffraction of light and thus causes a light-modulation in this device.

The claims are:

1. An improved optical control device for an integrated optical circuit, said control device incorporating a substrate and a wave guide layer associated with one face thereof, said substrate and said wave guide layer each being comprised of monocrystalline material selected from the group consisting of strontium titanate and barium titanate, and mixed compositions of strontium titanate and barium titanate, provided that, when said substrate comprises monocrystalline strontium titanate, said wave guide layer is comprised of a monocrystal selected from the group consisting of barium titanate and mixed compositions of barium titanate and strontium titanate, and, when said substrate comprises a monocrystal selected from the group consisting of barium titanate and mixed compositions of barium titanate and strontium titanate, said wave guide layer comprises monocrystalline strontium titanate.

2. The optical control device of claim 1, wherein said mixed composition consists of 97 mole % of barium titanate and 3 mole % of strontium titanate, and has the formula $Ba_{0.97}Sr_{0.03}TiO_3$.

3. The optical control device of claim 1 wherein an intermediate dielectric layer comprised of silicon dioxide is applied over said wave guide layer, and further wherein an electrode pair is applied over said dielectric layer.

4. An optical control device of claim 3 employed as a polarizer.

5. An optical device of claim 3 employed as a modulator.

6. An optical device of claim 3 employed as a deflector.

7. An optical device of claim 3 employed as a switch.

8. The optical control device of claim 3 wherein said electrode pair is comprised of combed shaped members whose respective teeth are interdigitated and located in laterally spaced relationship to one another.

9. The optical control device of claim 8 wherein said wave guide layer is epitaxially grown on said substrate.

10. The optical control device of claim 8 wherein said wave guide layer is grown by diffusion on said substrate.

11. A process for making an optical control device comprising the steps of
(A) locating a wave guide layer in adjoining relationship to a substrate, said substrate and said wave guide layer each being comprised of monocrystalline material selected from the group consisting of strontium titanate, barium titanate, and mixed compositions of strontium titanate and barium titanate, provided that, when said substrate comprises mono-crystalline strontium titanate, said wave guide layer is comprised of a monocrystal selected from the group consisting of barium titanate and mixed compositions of barium titanate and strontium titanate, and, when said substrate comprises a monocrystal selected from the group consisting of barium titanate and mixed compositions of barium titanate and strontium titanate, said wave guide layer comprises monocrystalline strontium titanate,
(B) placing a dielectric silicon dioxide layer over said wave guide layer, and
(C) placing a pair of electrodes over said dielectric layer.

12. The process of claim 11 wherein said locating is accomplished by liquid phase epitaxy.

13. The process of claim 11 wherein said locating is accomplished by diffusion.

14. The process of claim 11 wherein after said locating is accomplished said wave guide layer is heated to a temperature above its Curie point in an electric field and then is cooled to a temperature below its Curie point.

* * * * *